(12) United States Patent
Miura et al.

(10) Patent No.: US 12,116,656 B2
(45) Date of Patent: Oct. 15, 2024

(54) Ti-CONTAINING Fe—Ni—Cr ALLOY HAVING SUPERIOR QUALITY ON SLIT CUT SURFACE

(71) Applicant: Nippon Yakin Kogyo Co., Ltd., Tokyo (JP)

(72) Inventors: Toshio Miura, Kawasaki (JP); Kazuhito Takimoto, Kawasaki (JP); Fumiaki Kirihara, Kawasaki (JP); Shigeru Hirata, Kawasaki (JP)

(73) Assignee: NIPPON YAKIN KOGYO CO., LTD., Tokyo (JP)

( * ) Notice: Subject to any disclaimer, the term of this patent is extended or adjusted under 35 U.S.C. 154(b) by 585 days.

(21) Appl. No.: 17/275,538

(22) PCT Filed: Sep. 17, 2019

(86) PCT No.: PCT/JP2019/036349
§ 371 (c)(1),
(2) Date: Mar. 11, 2021

(87) PCT Pub. No.: WO2020/059700
PCT Pub. Date: Mar. 26, 2020

(65) Prior Publication Data
US 2021/0317555 A1    Oct. 14, 2021

(30) Foreign Application Priority Data
Sep. 20, 2018 (JP) ................. 2018-176165

(51) Int. Cl.
*C22C 38/50* (2006.01)
*C22C 30/00* (2006.01)
(Continued)

(52) U.S. Cl.
CPC .............. *C22C 38/50* (2013.01); *C22C 30/00* (2013.01); *C22C 38/001* (2013.01);
(Continued)

(58) Field of Classification Search
None
See application file for complete search history.

(56) References Cited

U.S. PATENT DOCUMENTS

| 11,118,250 B2 | 9/2021 | Mizuno et al. |
| 2020/0347488 A1 | 11/2020 | Mizuno et al. |

FOREIGN PATENT DOCUMENTS

| JP | S58-154469 A | 9/1983 |
| JP | 2000-017398 A | 1/2000 |

(Continued)

OTHER PUBLICATIONS

Vander Voort, George. "Embrittlement of Steels." ASM Handbook, vol. 1: Properties and Selection: Irons, Steels, and High-Performance Alloys. ASM Handbook Committee. pp. 689-736. 1990. (Year: 1990).*

(Continued)

*Primary Examiner* — Brian D Walck
(74) *Attorney, Agent, or Firm* — Oliff PLC (57) ABSTRACT

Alloy compositions, structures, and production methods for an appropriate slit cut surface shape improve productivity by increasing welding speed and stabilizing quality during high speed welding in Ti-containing Fe—Ni—Cr alloy production. The Ti-containing Fe—Ni—Cr alloy contains, hereinafter in weight %, C: 0.001 to 0.03%, Si: 0.05 to 1.25%, Mn: 0.10 to 2.00%, P: 0.001 to 0.030%, S: 0.0001 to 0.0030%, Ni: 15 to 50%, Cr: 17 to 25%, Al: 0.10 to 0.80%, Ti: 0.10 to 1.5%, N: 0.003 to 0.025%, O: 0.0002 to 0.007%, Fe as a remainder, and inevitable impurities, and when the number and size of titanium nitrides contained in material are evaluated in a freely selected field of view of 5 mm2, the titanium nitrides having sizes of not more than 15 μm are not less than 99.3% of total of the titanium nitrides.

13 Claims, 4 Drawing Sheets

(51) Int. Cl.
   *C22C 38/00*   (2006.01)
   *C22C 38/02*   (2006.01)
   *C22C 38/04*   (2006.01)
   *C22C 38/06*   (2006.01)
(52) U.S. Cl.
   CPC ............ *C22C 38/002* (2013.01); *C22C 38/02* (2013.01); *C22C 38/04* (2013.01); *C22C 38/06* (2013.01)

(56) References Cited

FOREIGN PATENT DOCUMENTS

| | | |
|---|---|---|
| JP | 2014-161870 A | 9/2014 |
| JP | 201859148 A | 4/2018 |

OTHER PUBLICATIONS

Apr. 1, 2022 Office Action issued in Chinese Patent Application No. 201980061670.5.

Aug. 14, 2020 International Preliminary Report on Patentability issued in International Patent Application No. PCT/JP2019/036349.

\* cited by examiner

Ti-CONTAINING Fe—Ni—Cr ALLOY HAVING SUPERIOR QUALITY ON SLIT CUT SURFACE

TECHNICAL FIELD

The present invention primarily relates to a base material of a cladding tube for a sheathed heater and to a welding tube used in pipe layouts such as in petroleum processing plants, chemical plants, or heat exchanging apparatuses, and in particular, relates to Ti-containing Fe—Ni—Cr alloys having superior welding workability and reliable quality.

BACKGROUND ART

Ti-containing Fe—Ni—Cr alloys having superior corrosion resistance and heat resistance are used in a cladding tube of a sheathed heater and a welding tube used in pipe layouts such as in petroleum processing plants, chemical plants, or heat exchanging apparatuses due to the severe environments. A strip shaped raw material of the tube is produced by a so-called "slitting" in which a wide strip is continuously cut by a circular metallic blade. Good or inferior condition of a subsequent welding process is directly affected by good or inferior quality of this cut surface.

The slit strip is processed so as to have the shape of the letter C by a rolling forming, the slit cut surfaces are faced to each other, and welding is performed thereat. Therefore, it is desirable that the slit surfaces be tightly fitted. However, burrs, drips, nips or the like may form on the slit cut surface, and it is impossible for them to completely fit geometrically. Therefore, it is necessary to research cut surfaces that are more desirable for welding.

Figure 6A:
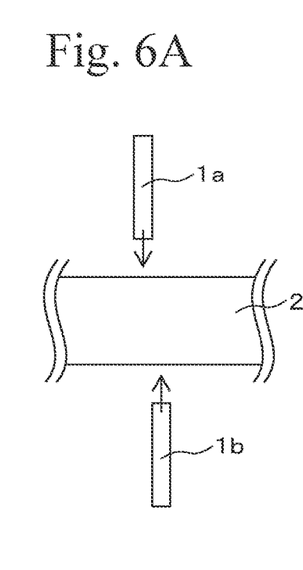
FIGS. 6A to 6C are conceptual diagrams explaining slit processing.
Figure 6B:
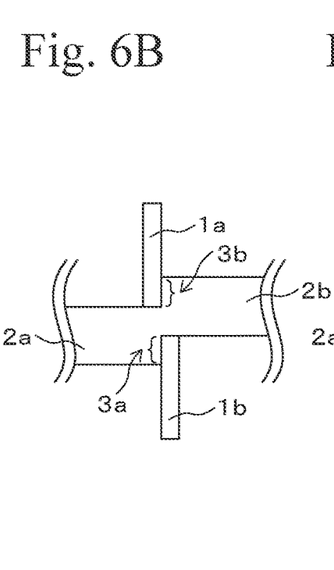
Figure 6C:
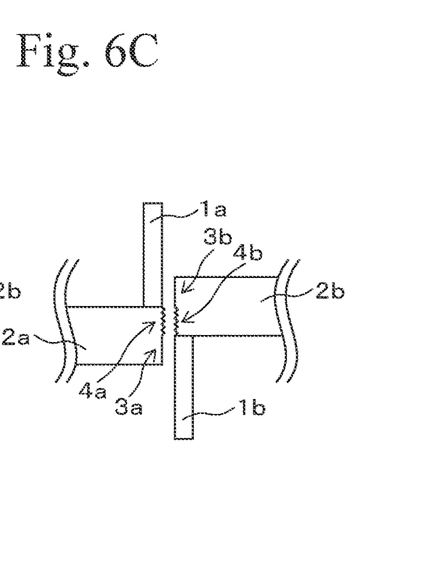
Figure 7:
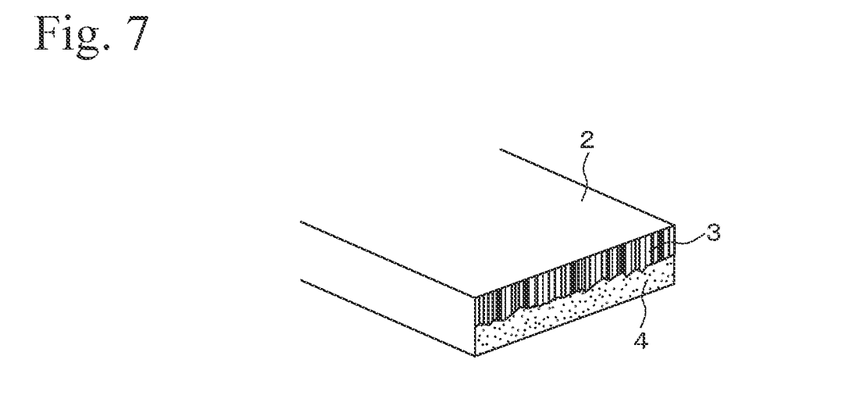
FIG. 7 is a conceptual diagram showing a cut surface of a steel material after slitting.

This situation is briefly explained with reference to FIGS. 6A to 6C. First, a slitting process is performed from both sides of steel plate 2 by using slit means 1a and 1b. Shear force is applied on both surfaces of the steel plate 2 by the slit means, and shear surfaces 3a and the 3b are formed at the steel plate 2a side and steel plate 2b, respectively. Consequently, the steel plates 2a and 2b are broken so as to form broken surfaces 4a and 4b, respectively. As shown in FIG. 7, in such a slit process, the shear surface 3 and the broken surface 4 are formed at a cut surface of the steel plate 2. The shear surface 3 is relatively flat; however, depending on the slit condition or composition of the steel plate, there may be a case in which complementary concave and convex portions are formed at the broken surface 4. Furthermore, although a border line between the shear surface and the broken surface should ideally be a straight line located at an end portion of the slit means 1a or 1b (see line A in FIG. 8), there also may be a case in which the border line is departing from this assumed line. Such concave and convex portions and portion of the border line departing from an ideal line may cause problems when the cut surfaces are tightly contacted with each other (hereinafter the portion of the border line departing from the ideal line is simply referred to as "departed" or "departed portion".)

For example, in Patent document 1, concerning Cu alloys, in order to maintain quality of laser welding of punched surfaces, combination of contacted surfaces (shear surface versus shear surface, or shear surface vs broken surface), ratio of shear surface versus plate thickness, and roughness of shear surface are defined so as to obtain superior welding quality.

In Patent document 2, similarly, in order to perform high-frequency resistance welding of Cu alloys, ratios of shear surface to plate thickness, size of a drip and height of a burr are defined and an angle of contacted surfaces is made appropriate so as to reduce defects during welding. According to this, it is possible to perform resistance welding even using a material with a thickness of as little as 0.3 mm.

In Patent document 3, although welding is not performed, in order to prevent defects in lifetime due to mold, burr, or dust, appropriate cut surface shape of Fe—Ni alloys is proposed. This technique is close to the present invention from the viewpoint from how to approach obtaining an objective cut surface shape, and proposes to make sizes of non-metallic inclusions and alloy compositions appropriate.

The Patent documents are as follows.

Patent document 1: Japanese Unexamined Patent Application Publication No. 2014-161870

Patent document 2: Japanese Unexamined Patent Application Publication No. Showa 58 (1983)-154469

Patent document 3: Japanese Unexamined Patent Application Publication No. 2000-17398

SUMMARY OF INVENTION

However, in the techniques disclosed in Patent documents 1 to 3, the objective alloy is different from that of the present invention. Therefore, they cannot be used since formation of structures, kinds of non-metallic inclusions contained therein, methods of control thereof, and effects which they impart to quality of slit cut surfaces are different. Since the alloy composition is different, there is a possibility that unknown influencing factors exist. Therefore, in order to improve slit cut surface quality, research of the objective material should be performed not just on each single factor, but should also include unknown influencing factors.

In Patent document 1, roughness of a shear surface is limited to be extremely small, that is, 0.3 μm or 0.5 μm in arithmetic average. It is difficult to achieve this only by punching processing, and it is said to be desirable to employ post-processing such as machine processing or shaving on the shear surface. Cost may be increased if such post-processing is employed to produce a welding tube, and the technique differs from the present invention targeting welding as it is after slit cut.

In Patent document 2, it is necessary to be in contact to perform resistance welding, and roughness is defined such that ratio of shear surface to plate thickness is not less than 70%. However, in a case of TIG welding and laser welding, it is not necessary to sufficiently contact contacting portions, it is possible to weld in a condition in which there is a very small gap therebetween. Service life of a slit circular blade may be shortened if shear surface ratio is larger. Therefore, the ratio of shear surface should be smaller in order to maintain slit cut surface quality reliably along a longitudinal direction. If the welding method is different, necessary factors are also different.

In Patent document 3, a cross sectional shape is improved mainly by MnS; however, the objective alloy of the present invention contains Ti, having low hot workability and high solidification crack susceptibility. Therefore, it is necessary to reduce S content as much as possible and prevent edge cracking during hot processing, and the present invention alloy cannot completely rely on effects of MnS.

As explained above, the techniques in Patent documents 1 to 3 cannot be employed in the present invention technique in which Ti-containing Fe—Ni—Cr alloy is slit and then immediately welded to form a tube. Such technique has not yet been discovered. The present invention targets Ti-containing Fe—Ni—Cr alloy, and an object of the present invention is to find an alloy composition, structure, and production method thereof in which a slit cut surface shape can be appropriately made in order to improve productivity by increasing welding speed and in order to stabilize quality during high speed welding.

As a result of the inventors' research to solve the above problems, they found that it is most important to control compounds derived from contained Ti in order to solve the above problem, as a result of research on the effects of the size and number thereof in detail. In addition, annealing conditions of a product and relationship with structures of raw material slabs were also researched, and appropriate production methods were found, so as to complete the present invention.

That is, a Ti-containing Fe—Ni—Cr alloy having superior slit cut surface quality of the present invention contains, hereinafter in weight %, C: 0.001 to 0.03%, Si: 0.05 to 1.25%, Mn: 0.10 to 2.00%, P: 0.001 to 0.030%, S: 0.0001 to 0.0030%, Ni: 15 to 50%, Cr: 17 to 25%, Al: 0.10 to 0.80%, Ti: 0.10 to 1.5%, N: 0.003 to 0.025%, O: 0.0002 to 0.007%, Fe as a remainder, and inevitable impurities, and when the number and size of titanium nitrides contained in a material were evaluated in a freely selected field of view of 5 mm$^2$, the titanium nitrides having sizes not more than 15 μm were not less than 99.3% of the total of the titanium nitrides.

Mo is added in a case in which further superior corrosion resistance and heat resistance are required, and a method to improve adverse effects due to Ti is the same. That is, in the Ti-containing Fe—Ni—Cr alloy of the present invention, it is desirable to further contain Mo: 0.03 to 4.5%.

In addition to chemical compositions, the slit cut surface quality is not good unless the deposited titanium nitrides is in an appropriate range. That is, in the Ti-containing Fe—Ni—Cr alloy of the present invention, it is desirable that the number of titanium nitrides in a field of view of 5 mm$^2$ be in a range of 300 to 4000.

Furthermore, it is desirable that the material be slit by a slitting means, a line at which an end portion of the slit means is located and is parallel to upper and lower surfaces of the material is assumed as an ideal border line between a shear surface and a broken surface of ideal conditions of a slit cut surface, the entirety of the slit cut surface along 8 mm of the border line is observed, a portion in which an actual border line between a shear surface and a broken surface departing from the ideal border line is surrounded by a polygon having not fewer than six sides, an area of each departing portion is measured, total area thereof is calculated, and the total area of the departing portions is not more than 4% of the total area of the slit cut surface.

Furthermore, the slit cut surface is inferior if the crystal grain diameter is large. In order to obtain superior slit cut surface quality and improve welding properties in the Ti-containing Fe—Ni—Cr alloy of the present invention, it is desirable that the average value of the crystal grain diameter measured by EBSD be not more than 60 μm.

Furthermore, in the Ti-containing Fe—Ni—Cr alloy of the present invention, it is desirable that area ratio of crystal grain having a diameter not less than 4 times of the average crystal grain diameter measured by EBSD be not more than 25%. According to this, further superior properties can be obtained.

Effects of Invention

According to the present invention, since a superior cut surface can be reliably obtained even in a Ti-containing Fe—Ni—Cr alloy in which slit processing is difficult and a cut surface having departing portions easily occur, superior welding workability and reliable quality can be achieved for welding tubes, in particular, a small diameter tube having a thin plate. Therefore, the present invention is desirable for a cladding tube for a sheathed heater and a pipe arrangement for a petroleum processing plant, a chemical plant, a heat exchanger or the like for which high corrosion resistance and heat resistance are required.

BRIEF DESCRIPTION OF DRAWINGS

FIGS. 1A and 1B are conceptual diagrams showing results of observations of a slit cut surface; FIG. 1A shows a material in which departing portions are large, and FIG. 1B shows a good material in which departing portions are small.

BEST MODE FOR CARRYING OUT THE INVENTION

First, a basic technical concept, which is part of the background of the invention, is explained.

Figure 1A:
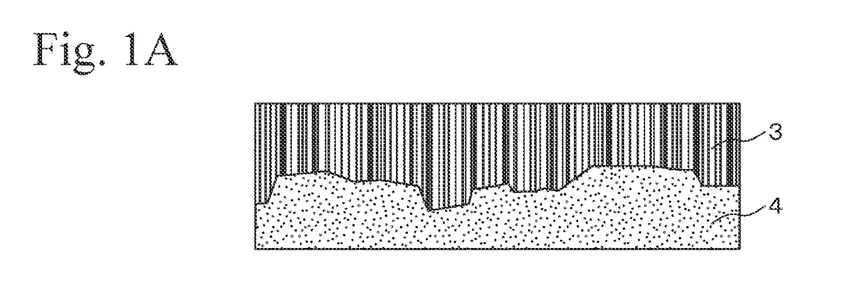
Figure 1B:
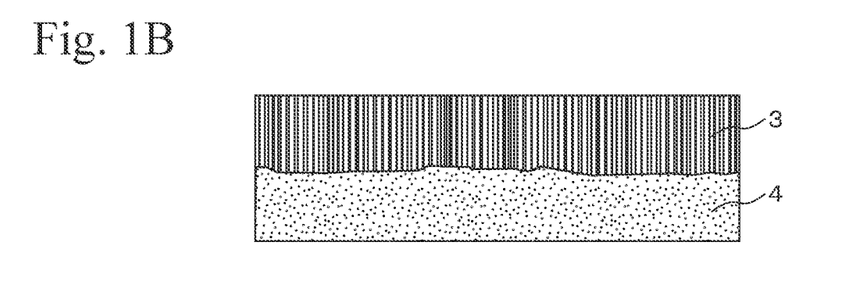

Slit processing was performed under various conditions, and obtained cut surfaces were compared. The cut surfaces include such as those in FIG. 1A and FIG. 1B which greatly differed in appearance. Regarding FIG. 1A, a border line between shear surface (reference numeral 3) and broken surface (reference numeral 4) greatly departed from a line in ideal conditions; on the other hand, regarding FIG. 1B, degree of departure was small. Each of these samples was welded by contacting both cut surfaces thereof, and there was no great difference observed in a range of low speed weldings; however, if speed was increased in order to increase productivity, concavity and convexity of a bead became larger in the sample of a cut surface of FIG. 1A, it melted and dropped off at the end, and reliable production could not be performed. Regarding the sample of FIG. 1B, there was a tendency for concavity and convexity of a bead to be slightly larger at the end, and welding was unreliable; however, production could be performed.

As a result of observation of cut surfaces in which the border line between a shear surface and broken surface greatly departed by SEM, a situation in which a rectangular inclusion becomes a point of origin and bores in the cut surface were observed, and the point of origin was about 15 μm. As a result of analyzing this portion, broken non-metallic inclusions were detected, and peaks of Ti and N were observed thereat. Since the present invention steel contains Ti, it was considered that TiN contained therein was involved.

Figure 2A:
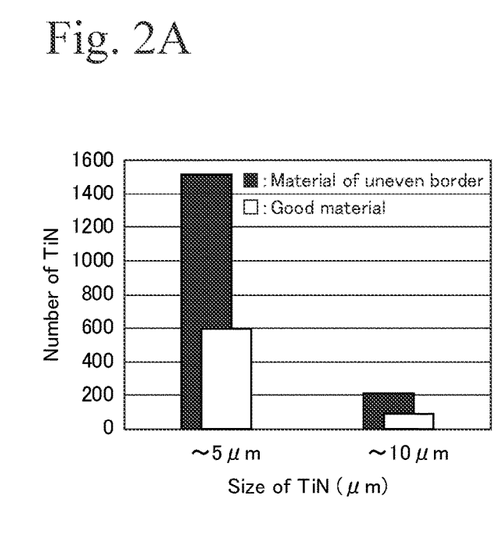
FIGS. 2A and 2B are a result of research of relationships between TiN size and number during observation of cross sections.
Figure 2B:
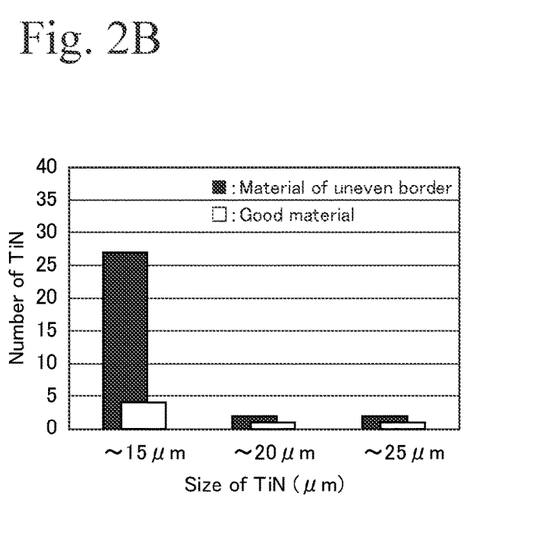

Then, regarding these two kinds of cut surfaces of steel freely selected, size and number of TiN particles were measured, and the results are shown in FIGS. 2A and 2B. As shown in FIGS. 2A and 2B, in the material in which the border line between shear surface and broken surface greatly departed (corresponding to FIG. 1A), the number of TiN particles was large, and many TiN particles more than 5 μm to about 15 μm were confirmed. On the other hand, in the good material (corresponding to FIG. 1B), few TiN particles having such sizes were observed. There were great differences observed in the number of TiN particles having a size almost corresponding to the departing portion of the cut surface. Based on this knowledge, and further by researching relationships between chemical compositions and TiN generation, appropriate ranges of composition were found and the present invention was completed.

Figure 3:
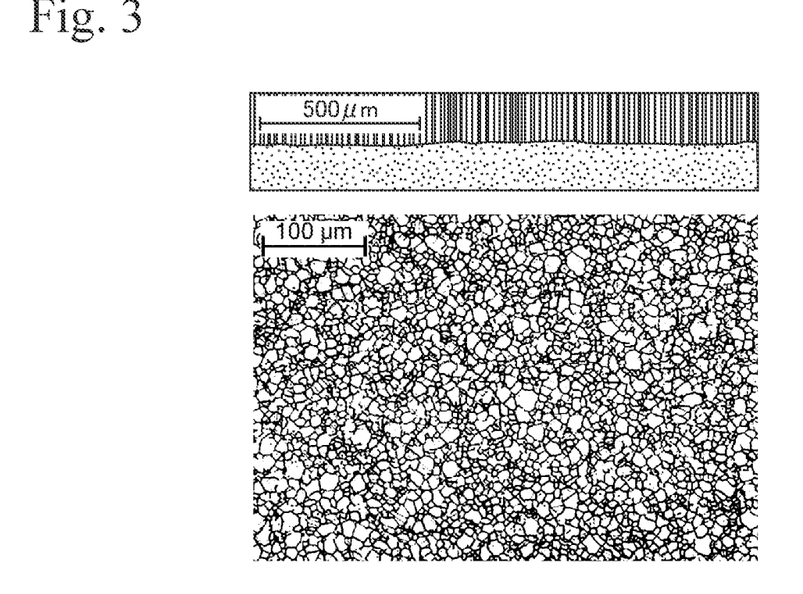
FIG. 3 is a conceptual diagram showing a slit cut surface (upper diagram) and cross-section structure (lower diagram) of a good material.
Figure 4:
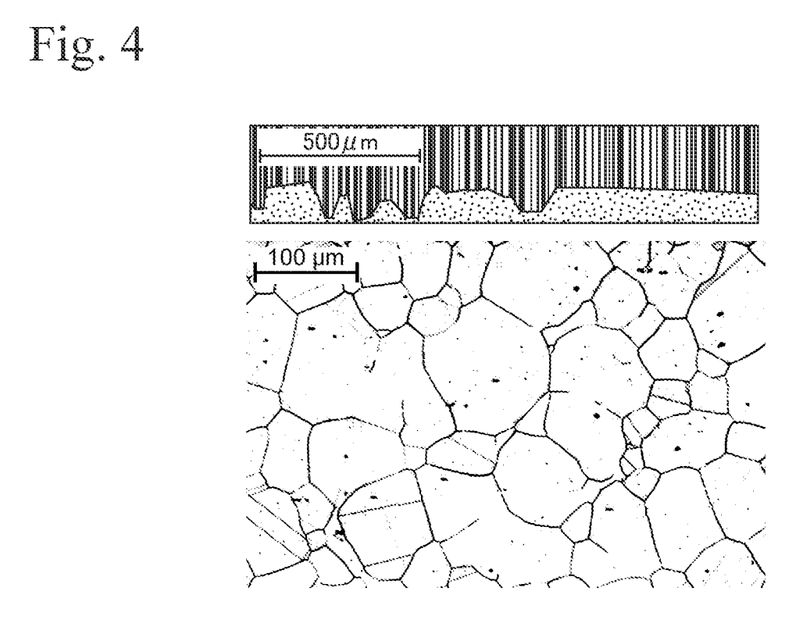
FIG. 4 is a conceptual diagram showing a slit cut surface (upper diagram) and cross-section structure (lower diagram) of a material having inferior cross section quality.

In addition, during this process, the following knowledge was also obtained. Two materials, of which the compositions were the same and only final annealing temperatures were different, were compared, conditions of border line between shear surface and broken surface on a cut surface of one material was extremely inferior and crystal grains of this composition was coarse (FIG. 4). On the other hand, conditions of a border line between shear surface and broken surface on cut surface of one material was very good and crystal grains of this composition were fine (FIG. 3). In this way, as a result of researching statistical effects in which crystal grain diameter affects conditions of cut surfaces, it became clear that finer grains are superior.

Figure 5:
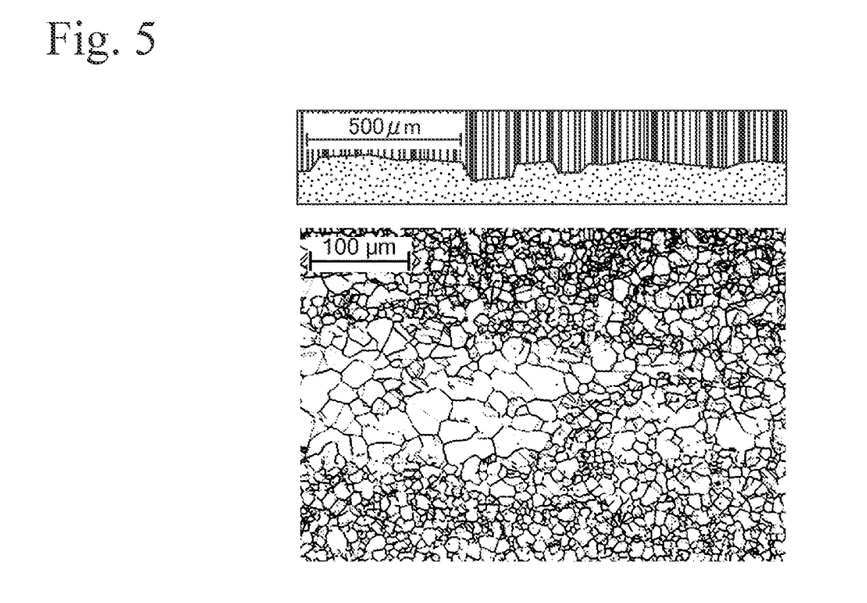
FIG. 5 is a conceptual diagram showing a slit cut surface (upper diagram) and cross-section structure (lower diagram) of a material having inferior quality of cross section (mixed grains).

Furthermore, in a material having so-called "mixed grains" shown in FIG. 5, it also became clear that a border line between shear surface and broken surface was uneven. It is ideal for crystal grains to be even; however, there is always a distribution to some extent according to effects of distribution of depositions or inclusions, plate thickness or the like. It tends to be a mixed grain structure if cold rolling ratio is small. Furthermore, in a case in which a slab is produced by a continuous casting method, the slab is hot-rolled to obtain a coil, and the coil is used as a raw material, it may become a mixed grain by macrostructure effects during continuous casting. In this way, the inventors have found that the border line between shear surface and broken surface may greatly depart and quality may be deteriorated in the case of mixed grains. It is assumed that this occurs because micro-deforming and breaking behavior is different depending on grain diameter. In order to prevent this, it is necessary to limit the degree of coarse grains. Therefore, in the present invention, definition is by an average crystal grain diameter measured by EBSD, and size and ratio of grains larger than the average.

Next, regarding the present invention, reasons for limitation of each parameter such as component of Fe—Ni—Cr alloy is explained as follows. It should be noted that % means weight % in the alloy component.

C: 0.001 to 0.03%

C in the alloy is a necessary element to stabilize an austenite phase and to maintain strength at normal temperatures and high temperatures. Therefore, it should be contained in at least 0.001%. On the other hand, excessive addition may generate Cr carbides and generate a Cr depletion layer therearound, causing extreme reduction in corrosion resistance. This phenomenon also occurs at welded heat-affected zones. Furthermore, it solid-solves in TiN so as to form Ti (N, C), promotes coarsening and increase in number. Therefore, it is necessary that the upper limit of addition be 0.03%. It is desirably 0.003 to 0.028%, and more desirably 0.005 to 0.025%.

Si: 0.05 to 1.25%

Si in the alloy is a necessary element to perform deoxidation, and to improve oxidation resistance, stress corrosion cracking resistance, melt metal flowability during welding, and penetration properties. These effects can be obtained by addition of at least 0.1%. However, excessive addition may increase inclusions, thereby increasing surface defects, and may decrease viscosity of melted metal, thereby generating welding defects such as burn through. Furthermore, Si increases the activity coefficient of Ti, promotes the following reaction, and forms many TiN particles greater than 15 μm.

$$Ti+N \rightarrow TiN(S) \tag{1}$$

In a case in which Si is greater than 125%, TiN particles greater than 15 μm exist at more than 0.7% of the entirety, and the number of TiN particles is greater than 4000. Therefore, the upper limit is 1.25%. It is desirably 0.10 to 1.00% and more desirably 0.15 to 0.75%.

Mn: 0.10 to 2.00%

Mn in the alloy is a necessary element to perform deoxidation the same as Si, and contributes to stabilizing an austenite phase. In particular, it is a useful element since increase in hardness due to addition is small, and an austenite phase can be stabilized while strength is made appropriate. Furthermore, it forms compounds with S, becomes points of origin of breaking during cutting, and contributes to improving quality of cut surfaces. Therefore, it is necessary to add at least 0.10%. However, since excessive addition deteriorates corrosion resistance, acid resistance, and in particular repeated oxidation properties, it is necessary that the upper limit is set at 2.00%. It is desirably 0.15 to 1.80% and more desirably 0.20 to 1.50%.

P: 0.001 to 0.030%

P in the alloy is a harmful element since it segregates at grain boundaries, increases welding cracking susceptibility, and decreases hot workability. Therefore, the upper limit should be strictly set. In the present invention, it is set to be not more than 0030%. On the other hand, if it is contained at not less than 0.001% in the alloy, P segregated at grain boundaries becomes a barrier, implantation accumulates around the grain boundaries, and formation of breaking origin points is promoted. In order to obtain this effect, this is set as the lower limit. It is desirably 0.003 to 0.025%, and more desirably 0.005 to 0.020%.

S: 0.0001 to 0.0030%

S in the alloy is a harmful element since it segregates at grain boundaries, forms low-melting point compounds, and deteriorates hot workability, and it should be reduced as much as possible. Therefore, the upper limit should be strictly limited. It is limited to not more than 00030% in the present invention. However, S forms compounds with Mn and Ti, becomes breaking origin points during cutting, and contributes to improving cut surface quality. To obtain this effect, it is necessary to add at least 0.0001%. Therefore, the lower limit is set. It is desirably 0.0002 to 0.0020%, and more desirably 0.0003 to 0.0010%.

Ni: 15 to 50%

Ni in the alloy is necessary to maintain stability of the structure since it is a stabilizing element of an austenite phase. Furthermore, it is necessary to improve corrosion resistance, and in particular stress corrosion cracking resistance, and it also acts to improve strength at high temperatures and to improve oxidation resistance. Therefore, it is necessary to add at least 15%. However, excessive addition causes increase in cost and too high strength at high temperatures, thereby making hot processing difficult. Therefore, the upper limit is set at 50%. It is desirably 16 to 46%, and more desirably 18 to 42%.

Cr: 17 to 25%

Cr in the alloy is an important element contributing to improvements in corrosion resistance and oxidation resistance, and it is a necessary element for use in severe environments. Therefore, it is necessary to be at least 17%. However, if it is contained at more than 25%, it reduces stability of an austenite phase and promotes deposition of carbides. Therefore, the upper limit is set at 25%. It is desirably 17 to 24%, and more desirably 19 to 23%.

Al: 0.10 to 0.80%

Al in the alloy is a necessary element to perform deoxidation, and also to contribute to improvements in oxidation resistance. In addition, it is also an important element forming compounds with Ni and contributing strength at normal temperatures and high temperatures. It is a necessary element to maintain blackening properties in a case in which the alloy is used as a cladding tube of a sheathed heater. Therefore, it is necessary to add at least 0.10%. However, if more than 080% is added, it may reduce stability of an austenite phase and form many inclusions in a base material. Therefore, the upper limit is set. It is desirably 0.15 to 0.70%, and more desirably 0.20 to 0.60%.

Ti: 0.10 to 1.5%

Ti in the alloy forms compounds with C, fixes C, and restrains deposition of Cr carbides during welding, thereby contributing to maintaining corrosion resistance. Furthermore, it is an important element since it promotes generation of compounds formed by Ni and Al, and facilitates improvements in strength at normal temperatures and high temperatures indirectly. Ti is one of the points of the invention exhibiting effects in a case in which an alloy is used in a severe environment. Furthermore, in a cladding tube of a sheathed heater, the same as Al, it is a necessary element to maintain blackening properties, and it is necessary to add at least 0.10% thereof. However, in a case in which it is added at more than 15%, excess TiN is generated, good cut surface quality is not obtained, and stability of an austenite phase is also deteriorated. Therefore, the upper limit is set. It is desirably 0.15 to 1.20%, and more desirably 0.20 to 0.80%.

N: 0.003 to 0.025%

Since N in the alloy forms compounds with Ti, it is desirable to reduce it as much as possible. Good cut surface quality is not obtained and frequency of generation of blow holes during welding is increased in a case in which it is contained at more than 0025%. Therefore, the upper limit is set. On the other hand, N improves strength at normal temperatures and high temperatures, increases stability of an austenite phase, and improves corrosion resistance. Therefore, it is necessary to add at least 0.003%. It is desirably 0.005 to 0.020%, and more desirably 0.007 to 0.015%.

O: 0.0002 to 0.007%

O in the alloy improves welding penetration properties and facilitates reduction in N amount during melting refining processes. Therefore, it is necessary to add at least 0.0002%. However, O combines with Al, Ti, Si and Mn so as to generate deoxidation products. Some amount contributes to improvements in cut quality, in a case in which it is contained at more than 0007%, since the deoxidation products cause deterioration of corrosion resistance and surface defects, this is the upper limit. It is desirably 0.0004 to 0.0050%, and more desirably 0.0008 to 0.0030%.

Titanium nitrides having sizes not greater than 15 μm not less than 99.3% of the total of the titanium nitrides in a freely selected field of view of 5 mm$^2$ Compounds called "Ti nitrides" or "TiN" in the present invention are inevitable compounds in Ti-containing Fe—Ni—Cr alloys, and one which is observed as TiN and Ti (N, C) is a target. Since sizes thereof greater than 15 μm may cause a border line between a shear surface and a broken surface to depart from the ideal line, it is desirable they be as small as possible. The mechanism thereof is assumed to be that if slit cutting is performed on Ti nitrides or in the neighborhood thereof, local cracking may be generated between Ti nitrides and the parent phase, and this may join with a main line so as to form irregular shapes. Therefore, even in a case in which TiN particles greater than 15 μm exist, it will not cause departing if it is not located at cut portion. As a result of research, in detail, it is permitted for it to be less than 0.7% in total number. Therefore, titanium nitrides having sizes not greater than 15 μm are limited to not less than 99.3% of total of the titanium nitrides. It is desirable that titanium nitrides having sizes not greater than 15 μm be limited to not less than 99.5% of the total, and more desirable that titanium nitrides having sizes not greater than 15 μm be limited to not less than 99.8% of the total. The number of titanium nitrides is 300 to 4000 in a freely selected field of view of 5 mm$^2$ Adverse effects of Ti nitrides are caused mainly by the sizes thereof, not the number thereof. However, if the number is increased, since distance among Ti nitrides is reduced, they behave as if they are the same as large ones. Therefore, the upper limit for the number of nitrides is 4000. On the other hand, there are also adverse effects observed in a case in which the number is too low, and so the lower limit is also set. Ti nitrides function as origin points of cracking where cracking is generated between Ti nitrides and a parent phase. In a case in which the number is too low, a border line between shear surface and broken surface is observed to be departing. Therefore, the lower limit is 300. It is desirably 400 to 3500, and more desirably 500 to 3000.

Mo: 0.03 to 4.5%

Since Mo in the alloy improves corrosion resistance and extremely improves strength at high temperatures, it is added in a case in which the alloy is used in severe environments. It is necessary to add at least 0.03% to obtain these effects. However, it is an expensive element, and excessive addition may cause increase in cost. Furthermore, excessive addition also may deteriorate stability of an austenite phase and promote generation of a σ phase, imparting adverse effects in corrosion resistance and toughness. Therefore, the upper limit should be set at 4.5%. It is desirably 0.05 to 4.0%, and more desirably 0.07 to 3.5%.

Average Crystal Grain Diameter Measured by EBSD not Greater than 60 μm

Crystal grain diameter has effects on strength and ductility of material. In order to maintain a balance between them, an extremely coarse crystal grain is not appropriate. Furthermore, it became clear that a border line between shear surface and broken surface greatly departs from the ideal line and more shear surfaces exist in a material having coarse crystal grain. Therefore, the average crystal grain diameter should be not more than 60 μm. It is desirably not more than 40 μm, and more desirably not more than 20 μm.

Area Ratio of Crystal Grain Having Diameter not Less than 4 Times Average Crystal Grain Diameter Measured by EBSD not More than 25%

In a case of a structure having uneven crystal grains, a so called "mixed grain structure", a border line between shear surface and broken surface may greatly departs, and quality may be deteriorated. In a case in which crystal grain diameter is fine, there often occurs differences in crystal grain diameters of several times, and effects of those not more than 4 times are not significant. In addition, even in a case in which crystal grains having diameters greater than 4 times exist, the effects are limited as long as they are not more than about 25%. Therefore, area ratio of crystal grains having diameter not less than 4 times of the average crystal grain diameter measured by EBSD is limited to not more than 25%. It is desirable that area ratio of crystal grains having diameters not less than 4 times the average crystal grain diameter measured by EBSD be limited to not more than 15%, and it is more desirable that area ratio of crystal grains having diameters not less than 4 times the average crystal grain diameter measured by EBSD be limited to not more than 5%.

EXAMPLES

Next, structure and effects of the present invention are further explained by way of Examples; however, the present invention is not limited to the scope of the Examples.

In order to prepare Fe—Ni—Cr alloys No. 1 to 50 having chemical compositions shown in Table 1, first, raw materials such as scraps, nickel, chromium, and molybdenum were melt in a 60 t electric furnace, mixture gas of oxygen and argon was blown in AOD (Argon Oxygen Decarburization) or VOD (Vacuum Oxygen Decarburization) so as to perform decarburization, and subsequently, ferrosilicon alloy and/or aluminum were added, Cr reduction was performed, and then, limestone and fluorite were added so as to perform deoxidation and desulfuration. Subsequently, a slab having 200 mm thickness×1000 mm width was produced by a continuous casting method. Next, a surface of the slab was ground, the slab was heated at 1000 to 1300° C., and was hot-rolled to make a hot rolled strip having a thickness 4 mm, and annealing, acid washing, and cold-rolling were repeated to make a thickness of 0.7 to 0.3 mm, and then, annealing and acid washing were performed to make a cold-rolled strip.

With respect to the cold-rolled strip, in order to have a width of 25 mm, slitting was performed under conditions of lap 0.20 mm, clearance 11% of thickness, and cutting rate of 70 m/min, and it was then evaluated. Welding of the strip into a tube was performed by TIG welding in a continuous welding tube production line. The line rate was 12 m/min, welding current was 135 A, and seal gas inside and outside was Ar+5% $H_2$. In addition, welding was also performed by $CO_2$ laser, and this was also evaluated. The conditions were line rate: 250 m/min, output: 2.0 kW, and seal gas: He.

(1) Measuring of Size and Number of Ti Nitride Particles

In order to enable observation on a cross section parallel to a rolling direction, an embedded sample was prepared, ground until it had a mirror surface, and observed by an optical microscope. Observation magnification was 200 times, multiple fields were observed so that the total observed area was 5 $mm^2$. Each of the observed fields was image-analyzed, and only Ti nitrides were extracted by color tone, and the number thereof was measured. Furthermore, the area of each of the Ti nitrides was measured, and the diameter of a circle corresponding to each area was regarded as the size of the particle.

(2) Evaluation of Slit Cut Surface

Figure 8:
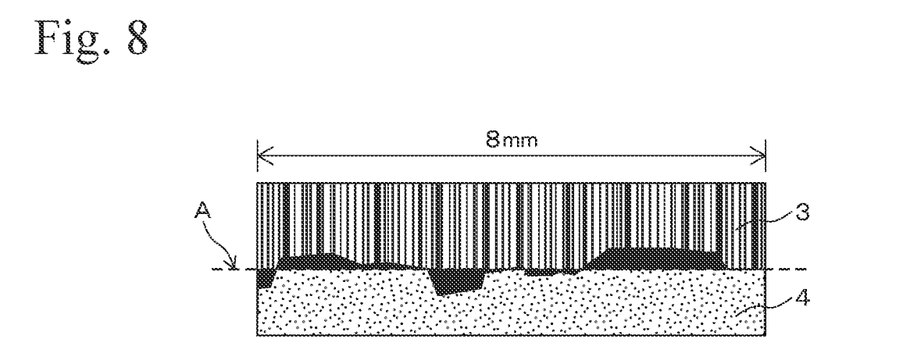
FIG. 8 is a conceptual diagram showing an evaluation method of a slit cut surface in Examples.

Regarding the obtained slit material, as shown in FIG. 8, the entirety of a slit cut surface was observed at a magnification of 80 times and a measured length of 8 mm, and this is regarded as the observed area. Dotted line A in FIG. 8 shows a line which should be a border line between shear surface 3 and broken surface 4 in FIG. 1A in ideal conditions, and corresponds to a line at which an end portion of slit means 1a or 1b is located in FIG. 6B. A portion which protrudes from this dotted line A toward the shear surface 3 side and the broken surface 4 side (black portions in FIG. 8) is regarded as a departing portion of which a border line of a shear surface and a broken surface is departing from the ideal line, and the departing portions were surrounded by a polygon having not fewer than six sides, each of the areas were measured, and the total area thereof was calculated. Evaluation was performed by a ratio of the total area of departing portions to the observed area. In the evaluation, a case in which the total area of the departing portions was not more than 1%, a case of more than 1% and not more than 2.5%, a case of more than 2.5% and not more than 4%, and a case of more than 4% are shown by A (superior), B (good), C (fair), and D (inferior), respectively. It should be noted that the departing portion of border line of shear surface and broken surface were measured in both directions upward and downward from the border line (dotted line A).

(3) Crystal Grain Diameter by EBSD

Samples were prepared so as to enable measurement of cross sections parallel to a rolling direction, a field of view of a total of 10 $mm^2$ was observed in conditions of voltage: 25 kV and step size: 5 μm by EBSD of FE-SEM, and average crystal grain diameter was calculated. Furthermore, area ratio of each grain diameter was calculated so as to evaluate the degree of mixed grains.

(4) Welding Test

The tube produced in the continuous welding tube production line was evaluated by an eddy current test. A defect size used as a scale (standard) was a slit having depth of 10 mm and length of 3 mm, which was introduced in the vertical direction to welding performing direction by electrospark machining on a surface. This was tested, and 80% of obtained wave height was regarded as a threshold value, and a sample which had more than the threshold value was regarded as defective. The number of defects generated along 2000 in of each sample was evaluated. A case in which the number of defects was not more than 10, a case of more than 10 and not more than 25, a case of more than 25 and not more than 40, and a case of more than 40 are shown as A (superior), B (good), C (fair), and D (inferior), respectively.

Results of the evaluation are also shown in Table 1. In Nos. 1 to 44, which are Examples of the present invention, there was no problem in quality of slit cut surfaces, and therefore, a tube can be produced without generating defects by TIG welding, and furthermore, by laser welding, which is difficult, because of faster welding speed.

It should be noted that since crystal grain diameter and/or ratio of mixed grains are/is without desirable range or are/is relatively high in Nos. 19 to 24, 43 and 44, and since the number of TiN is greater or less than the desirable range in Nos. 27 and 28, quality of slit surfaces and welding properties were allowable, and quality of slit surfaces was good in the other Examples.

On the other hand, in Nos. 45 and 46, many TiN particles having sizes greater than 15 μm were contained, thereby deteriorating slit surface quality, and as a result, welding properties were inferior.

Nos. 45 to 47 do not satisfy the chemical composition of Ti, N, and C of the present invention. Therefore, TiN or Ti (N, C) is coarsened or excessively generated, thereby deteriorating slit surface quality, and as a result, welding properties were inferior.

No. 48 does not satisfy the oxygen amount of the present invention. Therefore, although slit surface quality was at a level that did not matter, welding properties were extremely inferior, and welding could not be performed well by either TIG or by laser.

TABLE 1

|  |  | C | Si | Min | P | S | Ni | Cr | Al | Ti | N | O |
|---|---|---|---|---|---|---|---|---|---|---|---|---|
| Examples | 1 | 0.001 | 0.06 | 0.11 | 0.001 | 0.0028 | 49.8 | 17.2 | 0.76 | 0.12 | 0.003 | 0.0002 |
|  | 2 | 0.029 | 1.24 | 1.90 | 0.025 | 0.0001 | 15.2 | 24.8 | 0.11 | 1.40 | 0.024 | 0.0065 |
|  | 3 | 0.027 | 0.99 | 0.13 | 0.022 | 0.0013 | 16.7 | 23.5 | 0.15 | 0.15 | 0.006 | 0.0004 |
|  | 4 | 0.026 | 0.84 | 1.60 | 0.024 | 0.0002 | 45.2 | 23.8 | 0.18 | 0.18 | 0.019 | 0.0007 |
|  | 5 | 0.004 | 0.12 | 1.70 | 0.023 | 0.0015 | 43.1 | 18.7 | 0.63 | 0.99 | 0.005 | 0.0035 |
|  | 6 | 0.003 | 0.14 | 0.14 | 0.023 | 0.0019 | 17.6 | 18.6 | 0.67 | 1.15 | 0.017 | 0.0047 |
|  | 7 | 0.010 | 0.16 | 0.21 | 0.006 | 0.0003 | 22.0 | 21.4 | 0.21 | 0.21 | 0.009 | 0.0008 |
|  | 8 | 0.006 | 0.53 | 1.40 | 0.012 | 0.0007 | 18.4 | 19.2 | 0.45 | 0.32 | 0.007 | 0.0020 |
|  | 9 | 0.022 | 0.18 | 0.27 | 0.008 | 0.0004 | 19.2 | 20.1 | 0.52 | 0.42 | 0.014 | 0.0011 |
|  | 10 | 0.015 | 0.74 | 0.44 | 0.010 | 0.0009 | 20.2 | 22.8 | 0.34 | 0.53 | 0.008 | 0.0024 |
|  | 11 | 0.009 | 0.20 | 0.67 | 0.016 | 0.0006 | 21.5 | 20.6 | 0.26 | 0.27 | 0.010 | 0.0012 |
|  | 12 | 0.013 | 0.22 | 0.53 | 0.019 | 0.0008 | 31.3 | 19.7 | 0.59 | 0.37 | 0.011 | 0.0026 |
|  | 13 | 0.018 | 0.35 | 1.10 | 0.005 | 0.0005 | 29.8 | 22.0 | 0.38 | 0.77 | 0.013 | 0.0014 |
|  | 14 | 0.009 | 0.42 | 0.85 | 0.014 | 0.0010 | 30.2 | 21.8 | 0.46 | 0.68 | 0.015 | 0.0030 |
|  | 15 | 0.011 | 0.26 | 0.92 | 0.020 | 0.0007 | 30.7 | 22.5 | 0.41 | 0.57 | 0.012 | 0.0016 |
|  | 16 | 0.007 | 0.69 | 1.20 | 0.018 | 0.0005 | 19.8 | 21.2 | 0.30 | 0.43 | 0.011 | 0.0029 |
|  | 17 | 0.022 | 0.60 | 1.34 | 0.008 | 0.0009 | 41.7 | 22.4 | 0.38 | 0.76 | 0.009 | 0.0009 |
|  | 18 | 0.024 | 0.30 | 1.11 | 0.020 | 0.0003 | 35.6 | 22.9 | 0.44 | 0.53 | 0.015 | 0.0020 |
|  | 19 | 0.015 | 0.74 | 0.48 | 0.010 | 0.0009 | 19.2 | 20.0 | 0.34 | 0.32 | 0.008 | 0.0024 |
|  | 20 | 0.012 | 0.22 | 0.34 | 0.019 | 0.0008 | 30.5 | 20.3 | 0.59 | 0.37 | 0.011 | 0.0026 |
|  | 21 | 0.009 | 0.56 | 0.55 | 0.016 | 0.0006 | 18.1 | 20.6 | 0.30 | 0.35 | 0.009 | 0.0012 |
|  | 22 | 0.015 | 0.35 | 0.34 | 0.005 | 0.0005 | 35.2 | 19.9 | 0.38 | 0.77 | 0.012 | 0.0014 |
|  | 23 | 0.023 | 0.34 | 1.25 | 0.019 | 0.0008 | 21.1 | 19.9 | 0.26 | 0.53 | 0.008 | 0.0010 |
|  | 24 | 0.009 | 0.20 | 0.89 | 0.006 | 0.0005 | 23.5 | 21.6 | 0.34 | 0.27 | 0.015 | 0.0022 |
|  | 25 | 0.029 | 1.10 | 1.86 | 0.029 | 0.0029 | 48.0 | 24.7 | 0.79 | 1.29 | 0.022 | 0.0067 |
|  | 26 | 0.029 | 1.23 | 1.97 | 0.026 | 0.0024 | 49.5 | 24.1 | 0.72 | 1.46 | 0.023 | 0.0051 |
|  | 27 | 0.009 | 0.54 | 0.67 | 0.016 | 0.0006 | 31.7 | 20.8 | 0.29 | 0.27 | 0.010 | 0.0013 |
|  | 28 | 0.014 | 0.82 | 0.44 | 0.010 | 0.0009 | 20.2 | 22.8 | 0.31 | 0.53 | 0.011 | 0.0014 |
|  | 29 | 0.003 | 0.64 | 0.51 | 0.021 | 0.0005 | 16.7 | 18.8 | 0.67 | 0.24 | 0.008 | 0.0022 |
|  | 30 | 0.018 | 0.49 | 0.23 | 0.025 | 0.0006 | 42.0 | 18.4 | 0.16 | 1.08 | 0.009 | 0.0015 |
|  | 31 | 0.004 | 0.12 | 1.21 | 0.004 | 0.0008 | 45.5 | 23.8 | 0.52 | 1.15 | 0.010 | 0.0045 |
|  | 32 | 0.026 | 0.97 | 1.78 | 0.018 | 0.0002 | 25.6 | 23.9 | 0.33 | 0.41 | 0.006 | 0.0004 |
|  | 33 | 0.016 | 0.16 | 0.41 | 0.016 | 0.0003 | 39.5 | 21.3 | 0.22 | 0.79 | 0.011 | 0.0008 |
|  | 34 | 0.018 | 0.21 | 0.49 | 0.018 | 0.0005 | 39.9 | 22.8 | 0.44 | 0.74 | 0.007 | 0.0026 |
|  | 35 | 0.005 | 0.21 | 0.99 | 0.010 | 0.0006 | 40.2 | 19.4 | 0.59 | 0.67 | 0.008 | 0.0014 |
|  | 36 | 0.020 | 0.30 | 0.75 | 0.014 | 0.0005 | 38.9 | 22.6 | 0.47 | 0.62 | 0.012 | 0.0018 |
|  | 37 | 0.007 | 0.35 | 0.88 | 0.019 | 0.0007 | 25.0 | 22.2 | 0.34 | 0.34 | 0.009 | 0.0022 |
|  | 38 | 0.008 | 0.40 | 0.55 | 0.014 | 0.0004 | 25.5 | 20.4 | 0.54 | 0.35 | 0.010 | 0.0011 |
|  | 39 | 0.012 | 0.72 | 0.51 | 0.005 | 0.0008 | 25.7 | 22.9 | 0.33 | 0.29 | 0.014 | 0.0029 |
|  | 40 | 0.015 | 0.34 | 0.34 | 0.020 | 0.0010 | 24.9 | 20.9 | 0.35 | 0.22 | 0.015 | 0.0009 |
|  | 41 | 0.013 | 0.69 | 1.18 | 0.005 | 0.0005 | 41.0 | 22.5 | 0.29 | 0.46 | 0.013 | 0.0010 |
|  | 42 | 0.021 | 0.42 | 0.91 | 0.020 | 0.0009 | 24.6 | 22.9 | 0.23 | 0.54 | 0.008 | 0.0021 |
|  | 43 | 0.001 | 0.36 | 0.40 | 0.019 | 0.0002 | 29.9 | 22.9 | 0.38 | 0.33 | 0.011 | 0.0011 |
|  | 44 | 0.002 | 0.21 | 0.36 | 0.022 | 0.0006 | 40.8 | 23.0 | 0.21 | 0.78 | 0.008 | 0.0010 |
| Comparative examples | 45 | 0.007 | 0.95 | 1.04 | 0.021 | 0.0005 | 24.6 | 19.2 | 0.42 | (1.55) | 0.010 | 0.0011 |
|  | 46 | 0.012 | 0.35 | 0.74 | 0.013 | 0.0013 | 22.6 | 20.0 | 0.56 | 0.65 | (0.027) | 0.0018 |
|  | 47 | (0.035) | 0.45 | 0.99 | 0.007 | 0.0008 | 19.5 | 21.3 | 0.51 | 0.63 | 0.008 | 0.0028 |
|  | 48 | 0.018 | 0.43 | 1.16 | 0.018 | 0.0017 | 26.6 | 21.4 | 0.41 | 0.45 | 0.008 | (0.0075) |

|  |  | TiN (%) | Number of TiN (pos) | Mo | Crystal grain diameter (μm) | Mixed grain | Slit cut surface evaluation | TIG welding | Laser welding | Remarks (Out of range) |
|---|---|---|---|---|---|---|---|---|---|---|
| Examples | 1 | 99.3 | 3745 |  | 45 | 24 | B | B | C |  |
|  | 2 | 99.4 | 295 |  | 57 | 20 | B | B | C |  |
|  | 3 | 99.5 | 3225 |  | 32 | 7 | B | A | B |  |
|  | 4 | 99.6 | 3478 |  | 24 | 12 | B | A | B |  |
|  | 5 | 99.6 | 465 |  | 25 | 9 | B | A | B |  |
|  | 6 | 99.5 | 420 |  | 39 | 14 | B | A | B |  |
|  | 7 | 99.7 | 2881 |  | 19 | 5 | A | A | A |  |
|  | 8 | 99.8 | 551 |  | 20 | 4 | A | A | A |  |
|  | 9 | 99.9 | 1547 |  | 17 | 5 | A | A | A |  |
|  | 10 | 99.9 | 939 |  | 15 | 3 | A | A | A |  |
|  | 11 | 99.9 | 2366 |  | 14 | 3 | A | A | A |  |
|  | 12 | 99.7 | 1299 |  | 16 | 3 | A | A | A |  |
|  | 13 | 99.7 | 1984 |  | 15 | 1 | A | A | A |  |
|  | 14 | 99.7 | 706 |  | 15 | 2 | A | A | A |  |
|  | 15 | 99.8 | 2595 |  | 10 | 1 | A | A | A |  |
|  | 16 | 99.8 | 2126 |  | 8 | 2 | A | A | A |  |
|  | 17 | 99.8 | 2727 |  | 11 | 5 | A | A | A |  |
|  | 18 | 99.8 | 1815 |  | 13 | 3 | A | A | A |  |

TABLE 1-continued

|  | No. | | | | | | | | | |
|---|---|---|---|---|---|---|---|---|---|---|
|  | 19 | 99.9 | 1939 | | 65 | 10 | C | B | C | Crystal grain diameter |
|  | 20 | 99.9 | 1929 | | 64 | 12 | C | B | C | Crystal grain diameter |
|  | 21 | 99.9 | 2366 | | 45 | 27 | C | B | C | Mixed grain |
|  | 22 | 99.7 | 1498 | | 35 | 28 | C | B | C | Mixed grain |
|  | 23 | 99.7 | 1989 | | 69 | 15 | C | C | C | Crystal grain diameter |
|  | 24 | 99.8 | 2018 | | 45 | 29 | C | C | C | Mixed grain |
|  | 25 | 99.3 | 3777 | | 51 | 21 | B | B | C | |
|  | 26 | 99.4 | 3890 | | 55 | 19 | B | B | C | |
|  | 27 | 99.6 | 4554 | | 42 | 22 | C | C | C | Number of TiN, too high |
|  | 28 | 99.5 | 255 | | 31 | 8 | C | C | C | Number of TiN, too low |
|  | 29 | 99.6 | 445 | 3.68 | 32 | 8 | B | A | B | |
|  | 30 | 99.5 | 3089 | 3.88 | 21 | 14 | B | A | B | |
|  | 31 | 99.6 | 491 | 0.35 | 28 | 12 | B | A | B | |
|  | 32 | 99.6 | 3392 | 0.84 | 38 | 7 | B | A | B | |
|  | 33 | 99.8 | 2973 | 3.12 | 18 | 3 | A | A | A | |
|  | 34 | 99.8 | 751 | 3.45 | 13 | 4 | A | A | A | |
|  | 35 | 99.8 | 1337 | 3.21 | 12 | 3 | A | A | A | |
|  | 36 | 99.7 | 991 | 3.08 | 17 | 1 | A | A | A | |
|  | 37 | 99.9 | 2636 | 2.80 | 19 | 1 | A | A | A | |
|  | 38 | 99.9 | 1399 | 1.23 | 14 | 5 | A | A | A | |
|  | 39 | 99.7 | 1882 | 1.05 | 16 | 4 | A | A | A | |
|  | 40 | 99.8 | 806 | 1.34 | 11 | 2 | A | A | A | |
|  | 41 | 99.8 | 2495 | 1.19 | 15 | 3 | A | A | A | |
|  | 42 | 99.9 | 1745 | 1.13 | 10 | 1 | A | A | A | |
|  | 43 | 99.4 | 385 | 0.30 | 63 | 11 | C | B | C | |
|  | 44 | 99.3 | 4005 | 4.47 | 40 | 27 | C | B | C | |
| Comparative | 45 | 99.8 | 4201 | | 31 | 5 | D | D | D | Ti upper limit |
| examples | 46 | 99.8 | 4419 | | 17 | 3 | D | D | D | N upper limit |
|  | 47 | (99.2) | 2665 | | 15 | 3 | D | D | D | C upper limit |
|  | 48 | 99.8 | 765 | | 22 | 7 | B | D | D | O upper limit |

EXPLANATION OF REFERENCE NUMERALS 1a, 1b: Slit means
2, 2a, 2b: Steel material
3, 3a, 3b: Shear surface
4, 4a, 4b: Broken surface
A: Border line between shear surface and broken surface

The invention claimed is:

1. A Ti-containing Fe—Ni—Cr alloy comprising:
in weight %, C: 0.001 to 0.03%, Si: 0.05 to 1.25%, Mn: 0.10 to 2.00%, P: 0.001 to 0.030%, S: 0.0001 to 0.0030%, Ni: 15 to 50%, Cr: 17 to 25%, Al: 0.10 to 0.80%, Ti: 0.10 to 1.5%, N: 0.003 to 0.025%, O: 0.0002 to 0.007%, Fe as a remainder, and inevitable impurities, wherein when the number and size of titanium nitrides contained in a material are evaluated in a freely selected field of view of 5 mm$^2$, the titanium nitrides having sizes not greater than 15 μm are not less than 99.3% of the total of the titanium nitrides,
wherein the material is slit by a slitting means, a line at which an end portion of the slit means is located and is parallel to upper and lower surfaces of the material is assumed as an ideal border line between a shear surface and a broken surface of ideal conditions of a slit cut surface, the entirety of the slit cut surface along 8 mm of the border line is observed, a portion in which an actual border line between shear surface and broken surface departs from the ideal border line is surrounded by a polygon with not fewer than six sides, area of each departing portion is measured, total area thereof is calculated, and total area of departing portions is not more than 4% of the total area of the slit cut surface, and
wherein average crystal grain diameter measured by EBSD is not more than 60 μm.

2. The Ti-containing Fe—Ni—Cr alloy according to claim 1, wherein Mo: 0.03 to 4.5% is contained.

3. The Ti-containing Fe—Ni—Cr alloy according to claim 1, wherein the number of titanium nitrides in the field of view of 5 mm$^2$ is in a range of 300 to 4000.

4. The Ti-containing Fe—Ni—Cr alloy according to claim 1, wherein area ratio of crystal grains having diameters not less than 4 times the average crystal grain diameter measured by EBSD is not more than 25%.

5. The Ti-containing Fe—Ni—Cr alloy according to claim 1, wherein Mo: 2.8 to 4.5% is contained.

6. The Ti-containing Fe—Ni—Cr alloy according to claim 1, wherein the titanium nitrides having sizes not greater than 15 μm are not less than 99.5% of the total of the titanium nitrides.

7. The Ti-containing Fe—Ni—Cr alloy according to claim 1, wherein the titanium nitrides having sizes not greater than 15 μm are not less than 99.8% of the total of the titanium nitrides.

8. The Ti-containing Fe—Ni—Cr alloy according to claim 1, wherein the number of titanium nitrides in the field of view of 5 mm$^2$ is in a range of 400 to 3500.

9. The Ti-containing Fe—Ni—Cr alloy according to claim 1, wherein the number of titanium nitrides in the field of view of 5 mm$^2$ is in a range of 500 to 3000.

10. The Ti-containing Fe—Ni—Cr alloy according to claim 1, wherein the average crystal grain diameter measured by EBSD is not more than 40 μm.

11. The Ti-containing Fe—Ni—Cr alloy according to claim 1, wherein the average crystal grain diameter measured by EBSD is not more than 20 μm.

12. The Ti-containing Fe—Ni—Cr alloy according to claim 1, wherein the area ratio of crystal grains having diameters not less than 4 times the average crystal grain diameter measured by EBSD is not more than 15%.

13. The Ti-containing Fe—Ni—Cr alloy according to claim 1, wherein the area ratio of crystal grains having diameters not less than 4 times the average crystal grain diameter measured by EBSD is not more than 5%.

* * * * *